United States Patent Office 2,888,327
Patented May 26, 1959

2,888,327

PREPARATION OF DIBORANE

Roy M. Adams, Darlington, Pa., assignor to Callery Chemical Company, Pittsburgh, Pa., a corporation of Pennsylvania No Drawing. Continuation of application Serial No. 415,689, March 11, 1954. This application October 14, 1955, Serial No. 541,060

3 Claims. (Cl. 23—204)

This invention relates to new and improved methods for the preparation of diborane ($B_2H_6$) and more particularly to a new and improved method for preparing diborane in substantially quantitative yields from metal borohydrides ($MBH_4$) or metal hydrides (MH) and Lewis acids.

The boron hydrides or boranes in general and diborane in particular have been very thoroughly investigated in recent years because of their importance as possible high energy fuels. As a result of such investigations several methods have been developed for the preparation of diborane, most of which have been only moderately successful. One such method utilizes the reaction of an alkali metal borohydride, such as $NaBH_4$, or an alkali metal hydride, such as NaH, and a Lewis acid such as $BF_3$ or HCl to produce diborane. These compounds were first reacted in a dry state or in suspension in an inert liquid. It was found however that $NaBH_4$ and NaH do not react satisfactorily with acids in a dry state reaction because of the fact that a solid by-product of the reaction is formed, which contaminates the surface of the $NaBH_4$ or NaH and prevents further reaction. As a result the only satisfactory dry state reactions of $NaBH_4$ or NaH and Lewis acids have required an abrasive apparatus which will continually expose a fresh reaction surface. In carrying out a liquid phase reaction in a solvent not much success has been attained because of the fact that most of the solvents which have been used are destructively reactive with the diborane which is formed in the reaction. Furthermore it has been found that for both dry state and liquid phase reactions the reaction of $NaBH_4$ or NaH and a Lewis acid involves a relatively long reaction time, sometimes as long as 48 hours or more.

It is therefore one of the objects of this invention to provide a new and improved method for the preparation of diborane is substantially quanitative yields in a relatively short reaction time from a metal borohydride or metal hydride and a Lewis acid.

Another object of this invention is to provide an improved method for preparing diborane in which a metal borohydride or metal hydride and a Lewis acid are reacted in a fused salt mixture which melts at a temperature below the point at which there is any substantial conversion of diborane to higher boranes.

Another object is to provide an improved method for preparing diborane in which an alkali metal borohydride is dissolved in a fused salt mixture and reacted with a Lewis acid at a temperature below the point at which there is a substantial conversion of diborane to higher boranes.

Other objects of this invention will become apparent from time to time throughout the specification and claims as hereinafter related.

This new and improved process will be described more fully in the specification and the novelty thereof will be particularly pointed out and distinctly claimed.

This invention is based on the discovery that under certain conditions a metal hydride or borohydride, and particularly the alkali metal hydrides and borohydrides, and a Lewis acid may be reacted to produce substantially pure diborane in practically quantitative yields and in relatively short reaction times. If an alkali metal borohydride such as $NaBH_4$ is placed in a suitable reactor and mixed with gaseous $BF_3$ for a dry reaction practically no reaction takes place due to the fact that the surface of the $NaBH_4$ is immediately contaminated with a layer of by-product $NaBF_4$. A similar difficulty is encountered when $NaBH_4$ is reacted with HCl in the dry state. The same problem occurs when NaH and $BF_3$ are reacted to produce diborane. To prevent the solid NaH or $NaBH_4$ from being coated with a by-product of the reaction in a dry phase reaction it is necessary to use abrasive apparatus, such as a ball mill, to continually expose a fresh reactive surface and even then the yields of diborane are unsatisfactory. If a solvent is used to dissolve or suspend the $NaBH_4$ in most cases it will react with the diborane formed and destroy the diborane or convert the same to higher undesirable boranes. It has therefore become important to discover a suitable solvent for carrying out the reaction between $NaBH_4$ and acids without destroying the diborane which is formed. The solvent must be fluid and capable of dissolving or suspending an appreciable quantity of borohydride, such as $NaBH_4$, at a temperature below that at which appreciable pyrolysis of $B_2H_6$ occurs, which in general is below about 250° C.

It has been found that fused salt mixtures that melt below the pyrolysis temperature of $B_2H_6$ are satisfactory for carrying out the reaction of alkali metal hydrides and borohydrides with Lewis acids. These fused salt mixtures will dissolve a considerable quantity of $NaBH_4$ or suspend NaH for reaction and yet are fluid at temperatures below 250° C. Most fused salt mixtures which have been used in the past have had melting points in the range of 500° C. or higher, which has rendered them entirely unsuitable for this type of reaction. At such high temperatures a considerable pyrolysis of the diborane occurs and thus diminishes substantially the yeld of diborane from this reaction.

One fused salt mixture which has been found to be highly satisfactory is a mixture of an aluminum halide and alkali metal halides. In particular the mixture used was a mixture of $AlCl_3$, NaCl, LiCl, and KCl in a molar ratio of 4:1:1:1. This mixture melts at approximately 63° C., is very fluid at 75° C., and is capable of dissolving substantial amounts of $NaBH_4$ and yet is fluid enough to permit gaseous HCl or $BF_3$ to bubble through it. The exact eutectic composition of this quaternary salt mixture has not been determined. However, any mixture of these or other fused salts having a melting point below about 250° C. and not destructively reactive with either the reactants or the reaction products of this reaction is satisfactory for the purpose of the invention. Other fused salt mixtures which melt in the desired temperature range are the LiI—KBr eutectic, melting at 250° C., the LiI—LiBr eutectic, melting at 250° C., and the LiI—RbI eutectic, melting at 245° C., and the $NaCl—BeCl_2$ eutectic, melting at 215° C. When a substantial quantity of $NaBH_4$ was dissolved in the first named fused salt bath and gaseous HCl was bubbled through the mixture for about 3 hours a substantially quantitative yield of diborane was produced without production of contaminating by-products. In a similar manner a metal hydride, such as NaH, can be suspended in a fused salt mixture and reacted with a boron containing Lewis acid such as $BF_3$ or $MCl_3$ to produce diborane.

It has also been found that it is not necessary in all cases to dissolve the $NaBH_4$ in a melt of other fused salts. It has been found that certain mixtures of metal borohydrides are themselves fusible at relatively low temperatures and in such a fused state are quite reactive with Lewis acids for producing diborane. In particular it has been found that a mixture of equal quantities by weight of $LiBH_4$ and $KBH_4$ melts at about 110° C. When $BF_3$ or HCl is bubbled through this liquid melt a substantial yield of diborane is obtained. Another satisfactory mixture for carrying out this reaction comprises a mixture of $LiBH_4$, $KBH_4$, and $NaBH_4$ in proportions of 45%, 45% and 10%, respectively by weight. This mixture melts at about 96° C. and appears to be the eutectic composition for this ternary mixture. In a fused mixture of borohydrides each of the borohydrides may be considered to be in solution in the same sense that the borohydrides are dissolved in the other fused salt mixtures. When a Lewis acid such as $BF_3$, $BCl_3$ or HCl is bubbled through this molten mixture diborane is produced in relatively substantial yields.

It is to be understood, in connection with each of the foregoing examples, that the Lewis acid must be a boron compound when one of the reactants is a metal hydride. When one of the reactants is a borohydride the Lewis acid may be a boron compound such as $BF_3$ or $BCl_3$ or may be any other suitable acid such as HCl.

While there have been described a few embodiments of this invention it is to be understood that within the scope of the claims appended hereto this invention may be practiced otherwise than as specifically described.

This application is a continuation of copending application, Serial No. 415,689, filed March 11, 1954.

Having thus described my invention what I desire to claim and secure by Letters Patent of the United States is:

1. A method of preparing diborane comprising reacting a Lewis acid selected from the group consisting of hydrogen halides and boron halides with a fused mixture of at least two alkali metal borohydrides and recovering the resulting diborane thus formed.

2. A method according to claim 1 in which the alkali metal borohydrides are of the group consisting of lithium borohydride, potassium borohydride and sodium borohydride.

3. A method according to claim 1 in which the fused mixture of borohydrides is maintained at a temperature less than 250° C.

No references cited.